United States Patent

Werner

[15] 3,665,404

[45] May 23, 1972

[54] MULTI-PROCESSOR PROCESSING SYSTEM HAVING INTERPROCESSOR INTERRUPT APPARATUS

[72] Inventor: John R. Werner, Glendora, Calif.

[73] Assignee: Burroughs Corporation, Detroit, Mich.

[22] Filed: Apr. 9, 1970

[21] Appl. No.: 26,944

[52] U.S. Cl. ....................340/172.5
[51] Int. Cl. ....................G06f 9/18
[58] Field of Search ....................340/172.5

[56] References Cited

UNITED STATES PATENTS

| | | | |
|---|---|---|---|
| 3,421,150 | 1/1969 | Quosig et al. | 340/172.5 |
| 3,200,380 | 8/1965 | MacDonald et al. | 340/172.5 |
| 3,238,500 | 3/1966 | Jung et al | 340/172.5 |
| 3,312,951 | 4/1967 | Hertz | 340/172.5 |
| 3,482,264 | 12/1969 | Cohen et al | 340/172.5 |
| 3,543,242 | 11/1970 | Adams, Jr. et al. | 340/172.5 |

*Primary Examiner*—Raulfe B. Zache
*Assistant Examiner*—Sydney R. Chirlin
*Attorney*—Christie, Parker & Hale

[57] ABSTRACT

A data processing system has a plurality of processors each including an interrupt handler for interrupting the execution of object programs and controlling the handling of interrupt conditions. Apparatus distributes the load of handling a class of external interrupts between the processors on a dynamic priority basis. For example, if the processor having highest priority for handling the interrupt related to a particular input/output unit is busy handling an uninterruptable procedure or is otherwise unavailable when the input/output unit requires attention, the apparatus couples an interrupt transfer signal to the processor having the next highest priority and thereby enables the interrupt handler within that processor to service the input/output unit. Each processor within the system can include circuitry for generating transfer signals to enable any one of the processors to service each input/output unit.

11 Claims, 3 Drawing Figures

INVENTOR
JOHN R. WERNER
BY
Christie, Parker & Hale
ATTORNEYS

MULTI-PROCESSOR PROCESSING SYSTEM HAVING INTERPROCESSOR INTERRUPT APPARATUS

BACKGROUND OF THE INVENTION

1. Field of the Invention

This invention relates to data processing systems and, more particularly, to multi-processor data processing systems having interrupt facilities.

2. Description of the Prior Art

Data processing systems are known in which a processor will automatically interrupt its processing of a particular program in response to a variety of operating conditions. When its execution of the current program is interrupted, the processor does not cease operating. Rather, an interrupt handler within the processor becomes operative and performs certain bookkeeping and supervisory tasks. Typical bookkeeping tasks include the storage of current instructions, information and data to preserve the intermediate results which have already been obtained and to insure that the system will be able to return to the proper instruction at a later time and complete the processing of the interrupted program. A typical supervisory task is the initiation of data transfer between memory and an input/output device.

The interrupt handler can comprise a specific piece of hardware which generates a sequence of signals to control the system operation during the interrupt processing.

Alternatively, the interrupt handler can comprise means for causing the processor to jump to a procedure within a stored supervisory program. The processor will then handle the interrupt under programmatic control. The type of interrupt handler used in any computing system depends upon a trade-off analysis of the costs of additional hardware compared against the loss of computing speed which attends the use of a supervisory program.

The interrupt concept finds common application in the control of input operations of the data processing system. Typically, the speed with which an input unit can supply information is much slower than the speed with which a processor can handle data. It would be extremely inefficient to allow a processor to remain idle while it waits for an input unit to supply data.

Therefore, it is common for a processor to execute an input instruction at some point in advance of where the input information is to be used. The processor continues to process data until the input unit has assumed a predetermined operating status in which it is ready to supply data. A signal source is provided to produce a signal to notify the processor that the input/output unit requires the attention of the processor. The processor then interrupts its current program to perform supervisory tasks associated with handling the input information.

There are circumstances under which it is expedient to allow the processor to interrupt its current program. For example, the processor may have sensed an interrupt condition at an earlier time and may not have completed the execution of a supervisory task related to that interrupt. It is more practical to allow the processor to complete its handling of such interrupt conditions than to allow its interrupt handling to be interrupted. As a means of distinguishing between normal procedures which may be interrupted and other procedures which should not be interrupted in the ordinary course of processing, data processors employ a state control device. The state control device is set to normal state while the processor is executing the normal, interruptable procedures and is set to control state while the processor is executing control procedures such as interrupt handling. The interrupt handler is made responsive to the state control device so that when the state control device is in the control state, the interrupt handler will not respond to interrupt handling requests.

A problem arises when a large number of input/output units are assigned to a processor. The input/output units compete for the attention of the processors. While handling an interrupt condition for one of its assigned units, the processor is disabled from servicing its other units. Of course if there is only one processor, the other input/output units must wait for the processor to return to normal state before they can be serviced. In multi-processor systems, it is possible to have a second processor take over the handling of an external interrupt condition in the event that the first processor is unavailable. However, in most prior art data processing systems the interrupt handling load for each input/output unit was assigned exclusively to a particular processor. An improved interrupt system is disclosed in B. C. Thompson, et al., U.S. Pat. No. 3,286,239 which issued on Nov. 15, 1966 and is assigned to the same assignee as the present invention. The system disclosed in the referenced patent employs an interrupt mask register within each processor to control the assignment of input/output interrupt handling between the processors in a multi-processor system. The interrupt mask register contents determine whether the processor will accept or reject interrupt handling requests. Techniques are available to determine if one of the processors is receiving such a large number of interrupts that a queue of interrupt requests is accumulating. If a queue is developing the contents of the interrupt mask registers in the processors can be programmatically changed to reassign the input/output units.

SUMMARY OF THE INVENTION

The present invention resides in the use of apparatus for automatically distributing the load of handling a class of external interrupt conditions including interrupt conditions related to input/output operations between the processors of a multi-processor data processing system. Each input/output unit is dynamically assigned to one of a plurality of processors for handling its interrupts upon an indication that the input/output unit has assumed a predetermined status. The dynamic assignment of processors is on a priority basis. If a processor having the highest priority for servicing a particular input/output unit is already busy handling an interrupt or is otherwise unavailable for handling the processing operations related to input/output transfers, then a secondary assignment is immediately made between the processor having the next highest priority and the input/output unit.

An embodiment of the present invention lies in a data processing system having a memory, a plurality of input/output units and a plurality of processors. Each processor has its own interrupt handler and apparatus for effecting an assignment between the interrupt handler and an input/output unit.

In a preferred embodiment the interrupt handler comprises a controllable operator control network which operates under programmatic control. The operator control network controls the operation of data manipulating means within the processor to process the interrupt. A state control device is coupled to the controllable operator control network and has a normal state and a control state for causing the operator control network to assume normal and control states respectively.

The apparatus which effects the assignment between input/output unit and interrupt handler comprises gating means which is responsive to indications that an input/output unit requires attention and that the processor is not currently available for processing the interrupt. The gating means generate a transfer signal to cause other gating means to generate a secondary interrupt request signal. If the processor having the next highest priority is not busy its interrupt handler will respond to the secondary request and process the interrupt. Otherwise an assignment is made to the processor having the next highest priority.

DESCRIPTION OF THE PREFERRED EMBODIMENT

Figure 1:
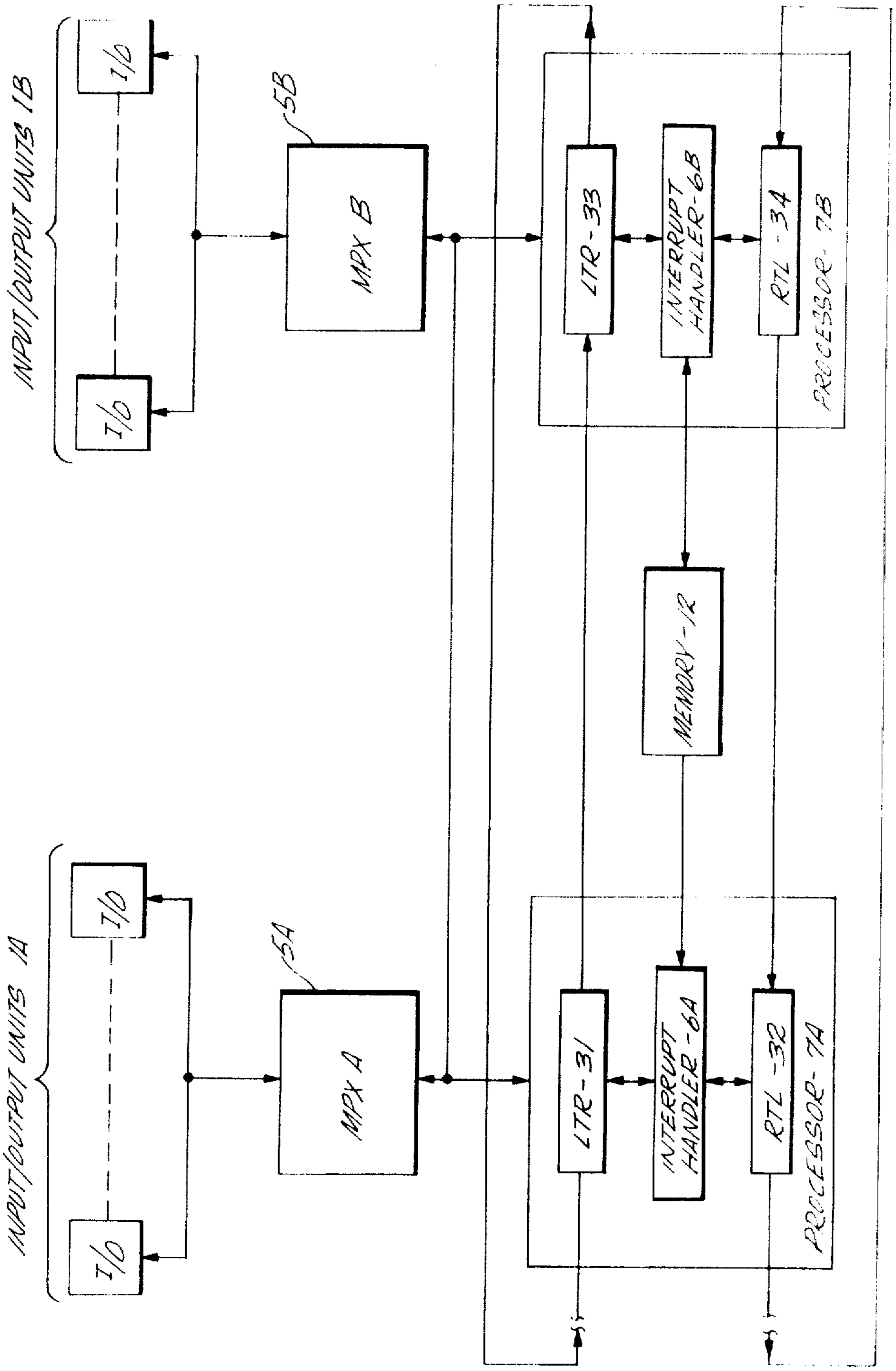
FIG. 1 is a block diagram of a multi-processor data processing system embodying the present invention.

The description of the preferred embodiment is best understood after considering in general the form of information representation used in the data processing system. "Program" is used herein to identify one or more procedures. A "-procedure" contains a number of different operators and the "operators" sequence the operation of the data processing system.

Information is handled in the data processing system in "-words." However, it should be understood that the invention is not restricted to a word-type machine but is applicable to other bit groupings such as digit groupings or individual bits. Although many different types of words are used in the actual data processing system, for purposes of the present invention, reference only needs to be made to operand words, return control words, program control words, operator words, indirect reference words and mark stack control words.

The operand words are the actual data to be processed. "-Program control word" is a word that is used to enter a new or at least a different procedure. A program control word contains a number of different items of information for this purpose. One item of information is a PIR field which is an address in the memory which indirectly identifies a series of operators making up the new procedure corresponding to the program control word. The PIR field is an address of another address reference word which in turn has the address of the first operator in the new procedure. Thus it should now be understood that a program control word is a procedure reference word which references the beginning of the new procedure.

"Return control word" is used to identify a procedure to which the data processing system is to return after having completed execution of a current procedure. Briefly, a return control word is formed whenever the processor executing one procedure is caused to enter a new or different procedure. The return control word is formed upon entering the new procedure and contains all of the information required to set up the machine to the state it left off with in the former procedure. Like the program control word, the return control word contains a PIR field which is an address in memory which identifies the first operator of a series of operators to be executed in the former procedure. Return control words and program control words are both referred to as procedure reference words. They are similar in format and in information content.

An indirect reference word is the address of a memory location which in turn stores a word yielding memory address information.

Mark stack control words are described hereinafter in connection with a discussion of the stack mechanism of the data processing system.

The central control of a processor operates in one of two states, namely control state, or normal state. "Control" state is a state wherein the operator control network causes execution of privileged instructions not available in normal state and these operators are known as "control state only operators." When in control state the operator control network will not cause execution of non-control operators nor will it cause execution of external interrupts. Control state is an important part of modern data processing systems as certain tasks require an uninterruptable condition as is provided through control state. Control state is used for handling functions which must be handled in coordination with other jobs co-existing in the same multi-processing system. An example of a control state activity which is especially pertinent to the present invention is the initiation of the transfer of information between the processor of memory and an input/output device.

"Normal" state is a state of the operator control network wherein none of the "control state only" operators can be executed. However, other operators can be executed and external interrupts can be handled.

The state in which the central control operates is controlled by a flip-flop. The state of the flip-flop is in turn controllable. Prior art processors have used different techniques for causing this flip-flop to assume the proper state. For example, an explicit instruction can be included in the instruction repertory of the processor which will cause the processor to set the flip-flop. A unique technique for controlling the state of the flip-flop is disclosed and claimed in a copending patent application entitled Method And Apparatus For Establishing States In A Data Processing System, filed Aug. 21, 1969, assigned Ser. No. 851,804, and assigned to the same assignee as the present invention.

The technique used in the system disclosed in the referenced application employs a signal in the procedure reference words to change the state of the flip-flop. For example, the program control words include a single bit identified as an N bit which identifies whether the new procedure referenced by the program control word is to be handled in normal state or control state. Similarly the return control word includes an N bit which identifies whether the return procedure is to be handled in normal state or control state.

Reference is now made to FIG. 1 which shows in general the coupling between the processors of a multi-processor data processing system embodying the present invention. A plurality of input/output units are shown generally as elements 1A and 1B. These units can be of many different types. For example, magnetic disk units, magnetic tape units, and card readers are commonly used as input/output devices for transferring data into and out of a data processing system. Neither the number of such units nor their internal design is material to an understanding of the present invention. The input/output units are shown as coupled to a pair of multiplexor units, MPX-A and MPX-B identified as elements 5A and 5B respectively. Multiplexor units are well known in the art and a description of their internal details is not pertinent to the present invention. It is sufficient for present purposes to point out that the multiplexors couple signals between the input/output units and the processors.

A pair of such processors are shown as elements 7A and 7B. Of course the spatial placement of the processors is immaterial but it is convenient for the purposes of identification to consider that 7A is to the left of 7B. Lines are shown between the processors and the multiplexor units to suggest a two way communication therebetween. On these lines, the processors couple a signal to the multiplexor units to indicate that data should be exchanged with an input/output unit. When the input/output unit has assumed a predetermined operating status it couples a signal to the processors on these lines. This signal indicates that the input/output unit needs the attention of a processor for the purpose of handling the data exchange. It is evident that the source of the attention-needed signal could be packaged outside of the input/output unit.

It should be noted that the present invention has applicability to any multi-processor system irrespective of the number of processors included therein. Accordingly, FIG. 1 shows broken lines adjacent processor 7A to suggest the existence of other processors not shown.

Within each processor is shown an interrupt handler and a line suggesting the coupling of the interrupt handler to memory 12. Preferably the interrupt handlers are programmatically controlled by a supervisory program stored in memory 12 in the manner which will be described hereinafter with reference to FIG. 2. It should be noted however, that the interrupt handlers can be self-controlled instead of programmatically controlled. Within processor 7A is shown left to right transfer circuit (LTR–31) and right to left transfer circuit (RTL–32) each of which is coupled to interrupt handler 6A. Within processor 7B is shown left to right transfer circuits (LTR–33) and right to left transfer circuit (RTL–34) each of which is coupled to interrupt handler 6B. The transfer circuits, in response to the attention-needed signals coupled to the processors through the multiplexors and to other isgnals to be described hereinafter, produce signals which determine the dynamic assignment of interrupt handlers according to a priority scheme. The left to right transfer circuits within a particular processor produce signals which can dynamically assign an interrupt handling load to a processor to the right of the particular processor. The right to left transfer circuits within a particular processor produce signals which can dynamically assign an interrupt handling load to a processor to the left of the particular processor. Once again, it should be emphasized that the use of spatially suggestive terms such as left and right is simply a matter of convenience and the actual physical placement of the processors is immaterial. Furthermore, although these transfer circuits are shown as packaged within the processors it will be evident to those skilled in the art that the transfer circuits can be distributed throughout the system rather than be packaged as shown.

The lines shown coupling the transfer circuits to the interrupt handler are intended to suggest a two way communication between the elements. The transfer circuits communicate with the interrupt handlers by providing an interrupt request signal; the interrupt handlers communicate with the transfer circuits by providing a signal indicating whether or not the interrupt handler is available to handle interrupt processing. Lines are shown coupling LTR-31 to LTR-33 and RTL-34 to RTL-32. On these lines transfer signals are transmitted to enable a second processor to handle an external interrupt when a first processor is busy. Also shown are lines emanating from LTR-33 and RTL-32. These lines serve to supply transfer signals as well. For example, consider a two processor system. In such a system there would be direct connections where the figure shows broken lines. A loop is formed such that LTR-31 can signal RTL-33 to cause RTL-33 to generate an interrupt request signal. Similarly LTR-33 can signal LTR-31 for the same purpose.

Figure 2:
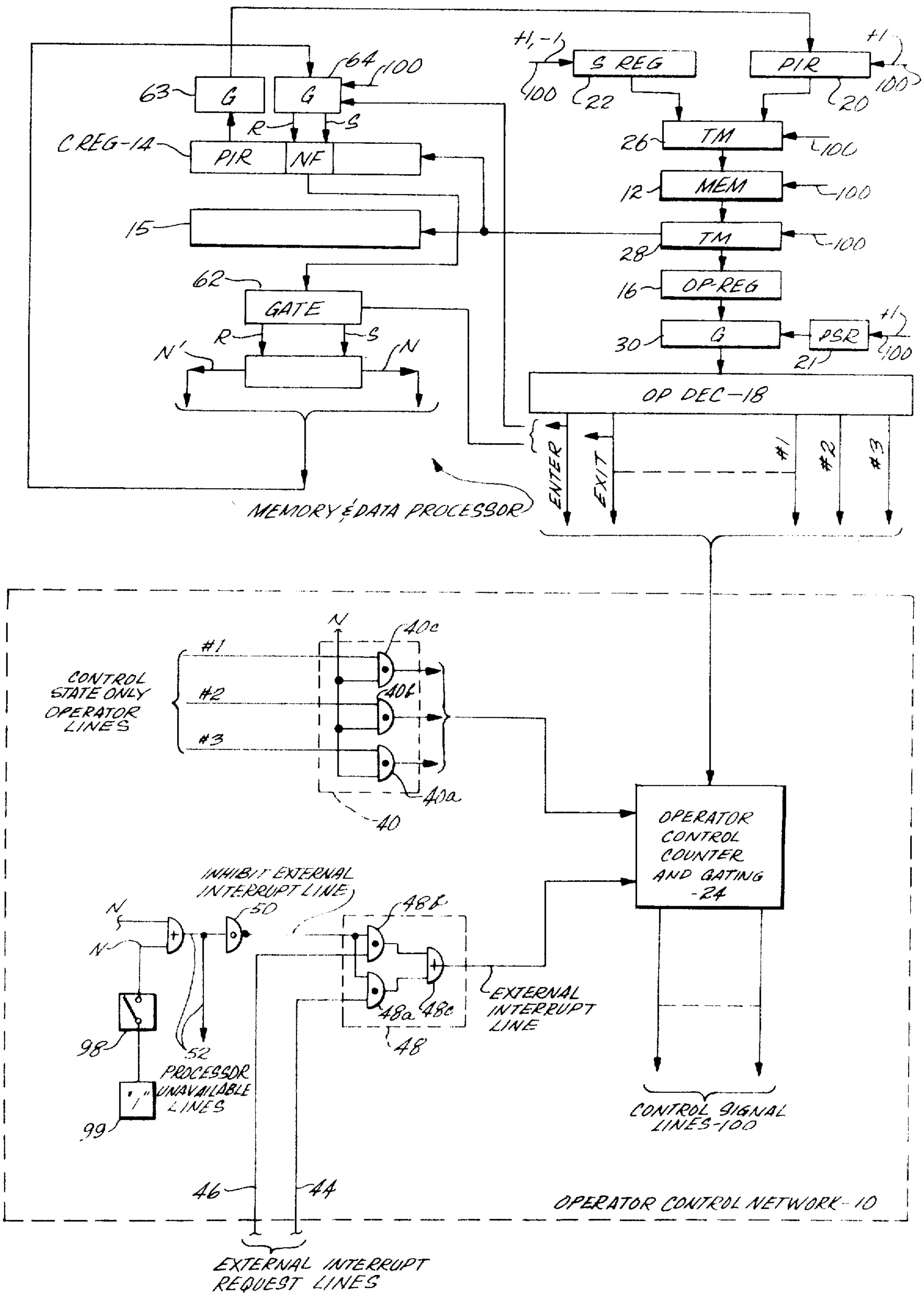
FIG. 2 is a block and schematic diagram of a processor having interrupt handling facilities.

With the information representation and overall block diagram generally in mind consider the details of a processor having a programmatically controlled interrupt handler shown generally in FIG. 2. The programmatically controlled interrupt handler comprises all those parts of the processor which effect the carrying out of the transfer of processor control from object programs to a stored supervisory program, the carrying out of supervisory program instructions in the proper sequence, and the application of the proper command signals to other system units such as input/output units in accordance with this interpretation.

An operator control network is shown generally at 10 and above 10 is generally shown a memory, the portion of the control element of the processor which effects the selection of instructions from memory and the interpretation thereof, and the data manipulation or arithmetic and logical element of the processor. The operator control network 10 contains an operator control counter and gating unit 24 which sequences the operation of the data processing system shown in the drawing. Operator control networks as used herein include the gating logic, counters and control necessary to control the operation of the data processing system. It will be evident to those skilled in the art that the control network can be distributed throughout the system rather than being combined into one unit.

Operator control counters and gating structures for sequencing data processors and memories during execution of operators are well known in the computer art and may be of many different types depending on the design of the particular data processing system. Therefore, the exact details of the operator control counter and gating unit 24 need not be explained for a complete understanding of the present invention. The operator control counter and gating unit 24 has control signal lines shown generally at 100 at which control signals are applied in the proper sequence to control the operation of the data processor and memory. The lines 100 are shown going into various circuits in the drawing for control purposes. All are identified by the general symbol 100, for simplicity. However, it will be understood that the lines in most cases are different and control signals may be applied on the various lines at different points in time depending on the sequence of operation of the control counter and gating unit 24.

The data processing system includes a memory 12. The memory 12 may be a magnetic core memory or any one of a number of other types of memories well known in the computer art. Memory 12 is arranged for reading out and writing information a word at a time in response to control signals on the control signal lines 100 from the central control 10. The words read out from the memory 12 are stored in either an operator register 16 or a C register 14 or data manipulation registers shown generally as block 15. Data manipulation registers could comprise adders, shift registers and the like which are well known in the art. Information may be stored in the memory 12 from C register 14 or one of the other registers within block 15. The address in the memory 12 at which information is read or written is determined by an address contained in either a PIR register 20 or an S register 22.

In the preferred embodiment of the present invention stacks are provided for storing operands and various types of reference words. The complete details of the operation of a stack are not essential to an understanding of the present invention and, therefore, only those details pertinent to the present invention are given. Such a stack is described in detail on pages 224 through 229 in a book entitled, "Electronic Digital Systems" by R. K. Richards, published in 1966 by John Wiley & Sons, Inc. Briefly, a stack is an area of memory in which words of information are stored on a last-in first-out basis. When a particular program stack is activated the C register 14 and registers within block 15 are linked to the stack of information in the memory. This linkage is established by the address contained in the S register 22 which points to the last (or top) word stored in the stack area in memory. Actually many stacks exist in the memory 12. Each of the stacks contain a mark stack control word which is useful in linking the stacks together. Any one of the stacks may be linked up to the registers 14 and registers within block 15 at any one time. The registers 14 and registers within block 15 are in effect the top of stack registers for the linked stack and extend the stack to enable quick access to the information in these registers. Details of such a stack and the register linkages are described in U.S. Pat. No. 3,548,384 entitled Procedure Entry For A Data Processor Employing A Stack, filed Oct. 2, 1967, and assigned Ser. No 672,042 and assigned to the same assignee as the present invention.

In operation the control counter and gating unit 24 of central control 100 applies a control signal on one of the control lines 100 to the transfer matrix 26 causing the address contained in the S register 22 to be applied to the memory 12. Actually the transfer matrix has several lines 100 connected thereto, only one being shown for illustration. The unit 24 also applies a signal on one of the control signal lines 100 to the memory 12, causing the content of the addressed memory location to be read out and applied to a transfer matrix 28. Assume that the word read out from the memory 12 is either a return control word or a program control word. The transfer matrix 28 is actually connected to a number of lines 100 and, for a program control word or return control word, an appropriate control signal is applied on one of the control signal lines 100 causing the transfer matrix 28 to store such word into the C register 14. The program control word or return control word is stored into the C register 14 with the PIR address in the field of the C register 14 identified by PIR and the N bit in an NF flip-flop.

After the address in the S register 22 is used to address the memory 12 the unit 24 applies a control signal on one of the lines 100 causing gating (not shown) in the S register 22 to count the address therein down one state so that it contains the address of the next word in the corresponding stack.

Consider now the PIR register 20 and the way in which operators are stored in the operator register 16. An individual operator word contains a plurality of operators. The PIR counter 20 points to or contains the address in memory of an operator word.

In operation the unit 24 applies a control signal on one of the control signal lines 100 to the transfer matrix 26 causing the state of the PIR register 20 to be applied to the memory 12. The memory 12 reads out the operator word from the corresponding address and applies the operator word to the transfer matrix 28. The unit 24 also applies a control signal on one of the control signal lines 100 to the transfer matrix 28 causing the operator word to be stored in the operator register 16.

Since only one operator of the operator word stored in the operator register 16 is to be executed at one time, a gating circuit 30 is provided for gating only one operator to an operator decoder 18. The particular operator gated out from the operator register 16 is determined by a PSR counter 21. The PSR counter 21 has a state for each operator stored in the operator register 16 which is to be applied to the operator decoder 18. The gating circuit 30 is responsive to each state of the PSR counter 21 for gating the corresponding operator to the operator decoder 18.

The operator decoder 18 has an operator output line (i.e. enter, exit— — —) for each different operator to be executed. A control signal is applied on the operator output line corresponding to each operator applied thereto by the gate 30. The control counter and gating unit 24 is coupled to all of the operator lines and goes through a sequence of steps corresponding to the operator line energized. The sequence of steps of the unit 24 cause the proper sequence of control signals on lines 100 to cause the particular operator to be executed by the data processor and memory.

It will be understood that all of the circuits for execution of a complete set of operators is not shown in the drawing but such circuitry is well known and need not be described in detail for a complete understanding of the present invention. After the control counter and gating unit 24 has applied the control signals at the control signal lines 100 required to execute an operator a control signal is applied on a control signal line 100 to the PSR counter 21 causing gating therein (not shown) to count it to the next state corresponding to the next operator in the register 16 to be executed. When the PSR counter 21 reaches its last state it re-cycles and starts counting through the states over again in response to control signals from unit 24. As the PSR counter is re-cycled the unit 100 applies a control signal to the PIR register 20 causing gating (not shown) to count the address in the PIR register 20 up one state. The unit 24 also causes the new address in PIR to be applied to the memory 12 and the operator word in such address is read out and stored in the operator register 16 as described above.

The state of the central control 10 i.e. "normal" or control state is determined by a flip-flop identified by the symbol NCF. A path exists from the C register 14 to the NCF flip-flop and a path exists from the NCF flip-flop back to the C register 14. The path between the C register 14 and the NCF flip-flop is provided by a gate 62. The gate 62 has R (reset) and S (set) lines which set the NCF flip-flop to a state corresponding to the state of the NF flip-flop in the C register 14. The state of the NF flip-flop is determined by a program control word or a return control word. The gate 62 is also controllable by certain operator lines (enter) from the operator decoder 18.

A gate 64 is coupled between the output circuits of the NCF flip-flop and the R (reset) and S (set) input circuits of the NF flip-flop in the C register 14. The gate 64 is controlled by the enter operator line from the operator decoder 18 for setting the NF flip-flop to a state corresponding to the state of the NCF flip-flop. The NF flip-flop is set corresponding to the state of the NCF flip-flop when a return control word is being formed in register 14.

Thus the state of the NCF flip-flop which controls the state of the operator control networks is saved in the N bit of the return control word stored in the C register 14 when a new procedure is entered.

Consider now the various types of operators which can be executed in either normal or control state. By way of example two different operators are given herein. However, other operators may be included. The two operators are: "enter" operator and "exit" operator.

In operation, an enter operator causes the data processor to enter a new procedure. Whenever an enter operator is to be executed control counter and gating unit 24 first generate signals at 100 causing a program control word to be stored into the C register 14, thereby setting the NCF flip-flop with the N bit of the program control word. When the gate 30 applies the enter operator to the operator decoder 18 a signal is applied on the enter operator line at the output of the decoder 18. The signal on the enter operator line causes the gate 62 to set the NCF flip-flop to a state corresponding to the state of the NF flip-flop in register 14. It may now be seen that the state of the NCF flip-flop may be determined by the N bit of a program control word stored into the C register 14.

A program control word is used to enter a new procedure, or start executing a different series of operators for a different procedure. Accordingly, it is necessary to set the PIR register 20 to the address corresponding to the first operator word of the new procedure. By way of example a gate 64 is provided and a control signal on one of the control signal lines 100 from the central control 10 causes the address contained in the PIR field of the C register 14 to be stored into the PIR register 20. Thus the next operator (of the new procedure) read out under control of the PIR register 20 is determined by the PIR address field of a program control word.

An enter operator also causes a return control word to be formed in register 14. One of the items of information placed in a return control word is the state of the central control for the procedure being executed at the time that the return control word is formed. Gate 64 is responsive to an enter operator and a control signal on one of the control signal lines 100 from the central control 10 for setting the NF flip-flop in register 14 to a state corresponding to the state of the NCF flip-flop. In this manner the state of the machine is preserved in the N bit of the return control word being formed in the C register 14. The rest of the steps for generating a complete return control word in the C register 14 is not explained herein as they are not essential for a complete understanding of the present invention. However, a complete description of the way in which the return control word is formed is described in the above-referenced patent application entitled Procedure Entry For A Data Processor Employing A Stack.

An exit operator causes a control signal on the exit operator line from the operator decoder 18. The return control word is always stored in the C register 14 prior to execution of the exit operator and a control signal on the exit operator line from the operator decoder 18 causes the gate 62 to set the NCF flip-flop to a state corresponding to that of the NF flip-flop in the C register 14.

Consider now the details of the operator control network 10 which responds to the NCF flip-flop. An enable control circuit 40 is provided which enables the control counter portion of the control counter and gating unit 24 to continue the sequence of operation for execution of one of the "control state only" operators. This can obviously be handled as an input to a control gate for the control counter.

For purposes of explanation the output lines from the operator decoder 18 which correspond to the control state only operators are referenced by the symbols No. 1, No. 2 and No. 3. The enable control circuit 40 has three AND gates referenced by the symbols **40*a*, 40*b* and 40*c* which are connected to the control state only operator lines No. 3, No. 2 and No. 1 respectively. An input of each of the AND gates 40*a*, 40*b* and 40*c* is connected to the N output of the NCF flip-flop. The N output receives a control signal whenever the NCF flip-flop is in a "1" state corresponding to a control state. Thus the enable control circuit 40 applies a control signal at the output of one of the AND gates 40*a*, 40*b* and 40*c*** when the NCF flip-flop is in a "1" state indicating a control state. The corresponding control state only operator line is activated.

The outputs of the AND gates **40*a*, 40*b* and 40*c* are individually connected to the control counter and gating unit 24. The signal at the output of one of the AND gates 40*a*, 40*b* and 40*c* causes the control counter portion of the operator control counter and gating unit 24** to continue with the execution of the corresponding control state operator.

An external interrupt line is shown coupled to operator control counter and gating unit 24. This line couples an input signal to cause unit 24 to control the handling of external interrupt conditions. In brief, unit 24 responds to such input signals by applying a sequence of control signals at the lines 100 to cause the external interrupt to be carried out.

There are a variety of circumstances under which it is inexpedient to permit the interruption of a current procedure. For example, the processor may be in a test mode and be operating under the control of a test console. As another example, the processor may be in the control state and may be already processing an interrupt condition.

An inhibit interrupt circuit 48 is shown in dotted lines. This circuit is provided for selectively enabling or inhibiting unit 24. Lines 44 and 46 are shown which couple external interrupt request signals to input terminals of circuit 48. Also shown is a line which couples an inhibit external interrupt signal in the form of a logical "0" level to circuit 48 during periods of time in which it is inexpedient to allow an external interrupt request to be handled. This inhibit signal is derived from NAND gate 50. The input to NAND gate 50 is coupled to OR gate 51 by a processor unavailable line 52. OR gate 51 could have many inputs of which two are shown on lines N and N''. Line N is coupled to the NCF flip-flop and carries a "1" level whenever the processor is in control state. Line N'' is coupled through switch 98 to source 99. Source 99 produces a logical "1" and could be a gate, flip-flop or the like. Line N'' is shown by way of example and would carry a "1" level when switch 98 is closed. Switch 98 could be closed when the processor is unavailable for external interrupt handling because the processor is under test or the like. If either line N or line N'' carries a "1" level then OR gate 51 will produce a "1" level on the processor unavailable line. The output of OR gate 50 is inverted by NAND gate 50 to produce a "0" level on the inhibit line.

Within inhibit interrupt circuit 48 there are shown AND gates **48*a* and 48*b* and OR gate 48*c*. One input of each AND gate is connected to the inhibit external interrupt line. The other input of each AND gate is connected to one of the external interrupt request lines 44 and 46. The outputs of AND gates 48*a* and 48*b* are coupled to the inputs of OR gate 48*c*. The output of OR gate 48*c* supplies the external interrupt input to unit 24. Thus, whenever a "1" level signal is applied on one of the external interrupt request lines 44 or 46 and both lines N and N'' carry a "0" level signal, NOR gate 50 and gating circuit 48 respond to produce a control signal on the external interrupt input to unit 24. The response of operator control counter and gating unit 24 to such an input is as follows: A mark stack control word is formed and inserted into the stack. An indirect reference word is formed which provides addressing information useful in obtaining a program control word which in turn provides addressing information useful in linking to a location in memory which is reserved for a stored executive program. From this location a link to an interrupt handling routine can be made. This routine will programmatically control the sequence of operations of the processor while it performs the supervisory task of handling the interrupt. The contents of all pertinent registers within the processor which contain data relevant to the current procedure are pushed into the stack. A series of words are pushed into the stack which provides relevant information regarding the type of interrupt condition present. Finally, unit 24 generates control signals to cause "enter" operator to be formed and placed in the stack. When the "enter" operator is executed it causes the procedure entry into the executive program. After the interrupt condition has been processed, a typical subroutine return linkage is effected by using the information contained in a return control word. If for some reason a control state exists (a "0" state of the NCF flip-flop) when an external interrupt signal is received the inhibit interrupt circuit 48 will block the signal and will prevent the operator control counter and gating unit 24** from handling the external interrupt condition.

From the foregoing description of a data processor having a programmatically controlled interrupt handler it can be appreciated that only one external interrupt can be processed at any given time in one processor.

Figure 3:
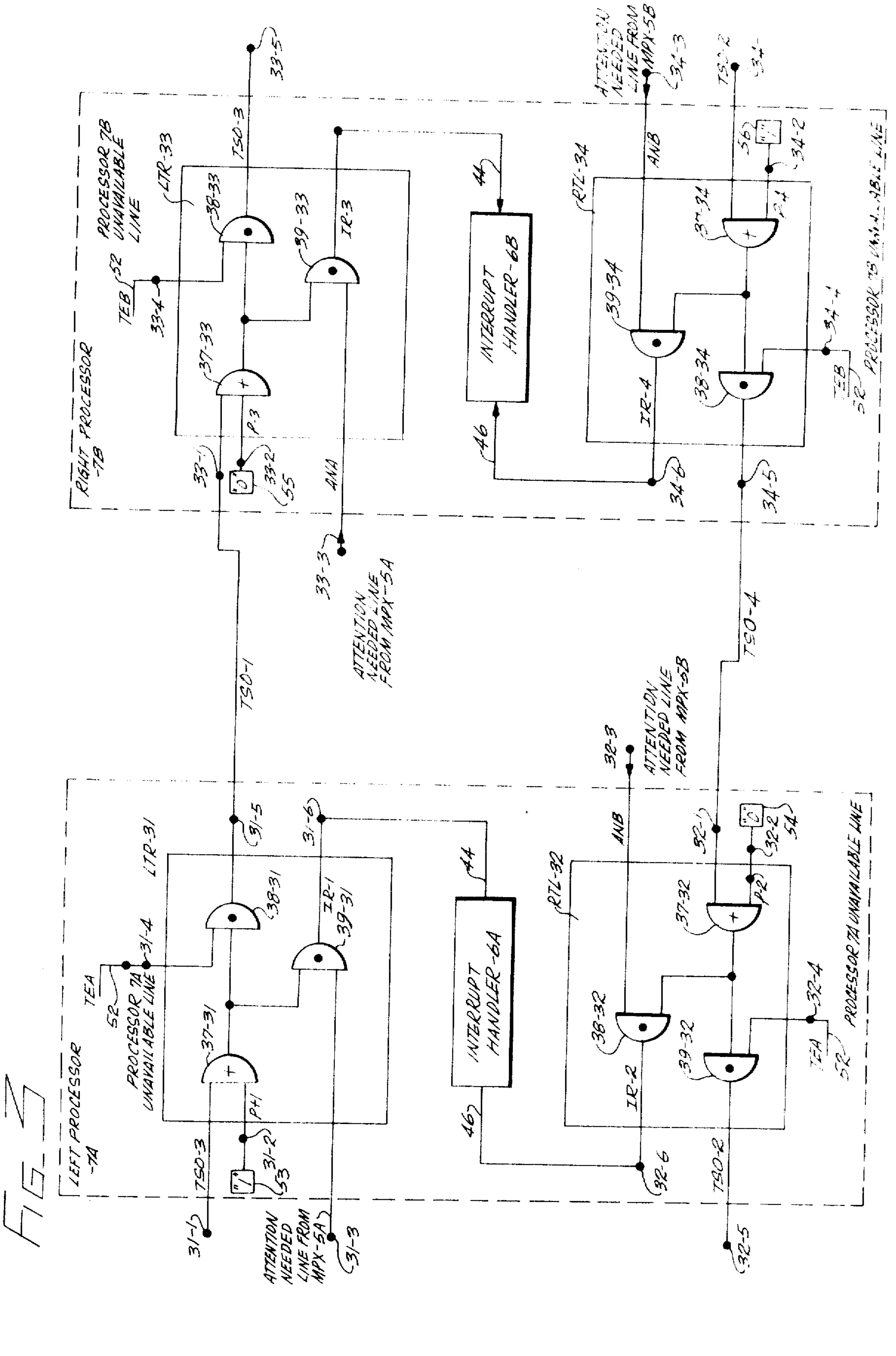
FIG. 3 is a block and schematic diagram illustrating in more detail the transfer circuits of FIG. 1

Consider now FIG. 3 which shows circuit details of the transfer circuits and the manner in which they are coupled together in a two-processor system. The two processors are again shown as left processor 7A and right processor 7B. Within left processor 7A there is shown left to right transfer circuit LTR–31, interrupt handler 6A, right to left transfer circuit RTL–32, and sources 53 and 54. Within right processor 7B there is shown left to right transfer circuit LTR–33 interrupt handler 6B, right to left transfer circuit RTL–34 and sources 55 and 56.

The function of the transfer circuits is to effect a dynamic assignment of interrupt handlers to the task of processing a class of external interrupt conditions. The transfer circuits perform this function in response to attention needed signals sent from MPX–5A and MPX–5B. An initial priority is established such that interrupt handler 6A will have the highest priority for processing interrupt conditions related to MPX–5A and interrupt handler 6B will have the highest priority for processing interrupt conditions related to MPX–5B. If interrupt handler 6A is currently unavailable when MPX–5A sends an attention needed signal, LTR–31 and LTR–33 effect a dynamic assignment of interrupt handler 6B to the task of processing the interrupt condition related to MPX–5A. If interrupt handler 6B is currently unavailable when MPX–5B sends an attention needed signal RTL–34 and RTL–32 effect a dynamic assignment of interrupt handler 6A to the task of processing interrupt conditions related to MPX–5B.

Each of the transfer circuits are shown having six coupling terminals which are identified by the reference numeral of the transfer circuit followed by a dash number. For example, the six terminals of LTR–31 are 31–1 through 31–6. Four of the six coupling terminals (–1 through –4) of each transfer circuit are input terminals and the remaining two coupling terminals (–5 and –6) of each transfer circuit are output terminals.

Terminals 31–4 and 32–4 are shown coupled to processor 7A unavailable line 52 which carries a signal produced by a gate within processor 7A such as OR gate 51 shown in FIG. 2. For purposes of the explanation this signal shall be referred to as TEA which is an acronym for transfer enable A. Terminals 33–4 and 34–4 are shown coupled to processor 7B unavailable line 52 which carries a signal produced by a corresponding OR gate 51 within processor 7B. For purposes of explanation this signal shall be referred to as TEB which is an acronym for transfer enable B.

Terminals 31–3 and 33–3 are coupled to the multiplexor identified in FIG. 1 as MPX–5A which produces an attention needed signal. For purposes of explanation this signal shall be referred to as ANA. Terminals 32–3 and 34–3 are coupled to the multiplexor identified in FIG. 1 as MPX–B which also produces an attention needed signal. For purposes of explanation this signal shall be referred to as ANB.

Terminal 31–1 is coupled directly to terminal 33–5 by a line not shown. The signal carried by this line will be referred to as TSO–3 which is an acronym for transfer signal output from LTR–33. A line is shown coupling terminal 31–5 to terminal 33–1. The signal carried by this line will be referred to as TSO–1. Terminal 32–5 is coupled directly to terminal 34–1 by a line not shown. The signal carried by this line will be referred to as TSO–2. A line is shown coupling terminal 34–5 to terminal 32–1. The signal carried by this line will be referred to as TSO–4.

Terminals 31–6 and 32–6 are coupled directly to interrupt handler 6A by lines 44 and 46 respectively. Lines 44 and 46 are the same lines 44 and 46 shown in FIG. 2. The signals carried by these lines are interrupt request signals which will be referred to as IR–1 and IR–2 respectively. Within interrupt handler 6A there are gates such as are shown as elements **48*a* and 48*b* in FIG. 2** which are connected to the corresponding lines 44 and 46 as shown in FIG. 2. These gates are partially enabled by the interrupt request signals. When one of these gates is fully enabled by the simultaneous occurrence of an interrupt request signal and an indication that the processor is available for interrupt handling, the gate supplies an external interrupt signal to operator and control counter 24.

Terminals 33–6 and 34–6 are similarly coupled to corresponding gates within interrupt handler 6B.

Terminals 31–2, 32–2, 33–2 and 34–2 are coupled to sources 53, 54, 55 and 56 respectively. Each of these four sources produces one of two logical signals which will be referred to as P–1, P–2, P–3 and P–4 respectively. The sources could be gates, flip-flops or the like. The logical signals coupled to the respective transfer circuits determine the initial priorities of assignment of interrupt handlers in a way which will become clear from the description of the manner of operation of the transfer circuits. Terminals 31-2 and 34-2 are coupled to sources 53 and 56 respectively, each of which produces a logical "1" and terminals 32–2 and 33–2 are coupled to sources 54 and 55 respectively, each of which produces a logical "0."

The circuitry within all four of the transfer circuits is alike. Therefore, the circuitry within LTR–31 will be taken as exemplary and described herein. OR gate 37 is shown having one input that is coupled to terminal 31–1 to accept therefrom the TSO–3 signal and another input that is coupled to terminal 31–2 to accept therefrom the P–1 signal. AND gate 38 is shown having one input that is coupled to the output of OR gate 37, having another input that is coupled to terminal 31–4 to accept therefrom the TEA signal, and having its output coupled to terminal 31–5 to supply thereto the TSO–1 signal. Therefore, whenever, TEA is a "1" and either TSO–3 or P–1 is a "1," AND gate 38 causes its output signal, TSO–1, to become a "1." AND gate 39 is shown having one input that is coupled to the output of OR gate 37, having another input coupled to terminal 31–3 to accept the ANA signal, and having its output coupled to terminal 31–6 to supply thereto the IR–1 signal. Therefore whenever ANA is a "1" and either TSO–3 or P–1 is a "1," AND gate 39 causes its output signal, IR–1, to become a "1."

From the foregoing description it can be seen that the following Boolean equations characterize the signal gating produced by the circuitry within LTR–31:

TSO–1=TEA·(TSO–3+P–1)

and IR–1=ANA·(TSO–3+P–1)

which simplify to TSO–1=TEA and IR–1=ANA because P–1 is always equal to a "1" by virtue of the logical level "1" produced by source 53.

By a similar process of simplification the Boolean equations which characterize the signal gating produced by the circuitry within the other transfer circuits reduce to the following equations:

| | |
|---|---|
| for | RTL–32 |
| | TSO–2=TEA·TSO–4 |
| and | IR–2=ANB·TSO–4; |
| for | LTR–33 |
| | TSO–3=TEB·TSO–1 |
| and | IR–3=ANA·TSO–1; |
| for | RTL–34 |
| | TSO–4=TEB |
| and | IR–4=ANB |

Consider now the manner in which LTR–31 and LTR–33 cooperate to effect a dynamic assignment of interrupt handlers to the task of handling the class of interrupt conditions associated with MPX–5A.

Assume that 55 and 53 are as shown forming "1" P–1 and "0" P–3 signals, respectively, thereby giving first priority for MPX–5A to processor 7A. Consider first the situation in which both processors 7A and 7B are in normal state and are otherwise available to process an interrupt. In this situation both the N and N'' inputs to OR gate 51 (see FIG. 2) of both processors 7A and 7B are a "0." Therefore, signals TEA and TEB to OR gates 51 in processors 7A and 7B are each a "0." Thus AND gates 38–31 and 38–33 produce "0" signals at TSO–1 and TSO–3 regardless of the ANA signal from MPX–5A. That is, no transfer signals between LTR–31 and LTR–33 are produced in the situation in which both processors are available for interrupt handling. Assume that MPX–5A produces a "1" ANA signal indicating that an input/output unit needs attention. The signal P–1 is a "1" indicating processor 7A has priority in interrupts from MPX–5A. Therefore OR gate 37–31 applies a "1" signal to AND gate 39–31 which together with the coincidence of the "1" ANA signal causes gate 37–31 to apply a "1" IR–1 signal. However processor 7B does not have first priority for MPX–5A hence the signal P–3 is a "0" causing OR gate 37–33 to apply a "0" signal to AND gate 39–33. As a result gate 39–33 applies a "0" signal. The "1" IR–1 signal presents an IR–3 interrupt request signal to interrupt handler 6A but signal IR–3 being a "0" signal does not present an interrupt request signal to interrupt handler 6B. Interrupt handler 6A responds to the IR–1 interrupt request signal and proceeds to process the interrupt condition. Thus it can be seen that an initial priority system has been established such that interrupt handler 6A for processor 7A has the highest priority for handling the class of interrupt conditions associated with MPX–5A.

Consider now the situation in which processor 7A is in control state (TEA is a "1"), processor 7B is in normal state (TEB is a "0") and MPX–5A produces a "1" ANA signal indicating that MPX–5A needs attention. Gate 37–31 (because of the "1" P–1 priority signal) again applies a "1" signal to AND gates 38–31 and 39–31. The coincidence of the "1" ANA signal causes AND gate 39–31 to apply a "1" IR–1 interrupt signal to interrupt handler 6A. The coincidence of the "1" TEA signal causes AND gate 38–31 to apply a "1" TSO–1 interrupt signal to OR gate 37–33 of LTR–33 (processor 7B). The OR gate 37–33 in turn applies a "1" signal to gate 39–33 which responds to the coincidence of the "1" ANA signal to apply a " 1" IR–3 interrupt signal to interrupt handler 6B.

The inhibit interrupt circuit 48 (see FIG. 2) causes interrupt handler 6A to ignore its IR–1 interrupt request signal because processor 6A is in control state. However, interrupt handler 6B responds to its IR–3 interrupt request signal and proceeds to process the interrupt condition. Thus it can be seen that a dynamic assignment of interrupt handler 6B to the task of handling interrupt conditions associated with MPX–5A has been effected when the higher priority processor for MPX–5A cannot be interrupted.

It should be noted that should it be desired to give processor 7B highest priority for MPX–5A and processor 7A lower priority that elements 55 and 53 would be reset so that the signals P–3 and P–1 are "1" and "0" signals. Under these conditions assume that processor 7B is in normal state (TEB is "0") signal and that MPX–5 forms a "1" ANA interrupt signal. The OR gate 37–33 responds by applying a "1" signal to the gates 38–33 and 39–33 and the coincidence of the "1" ANA signal causes gate 39–33 to apply a "1" interrupt signal IR–3 to interrupt handler 6B. The interrupt handler 6B being in normal state handles the interrupt. However, gate 38-33 receives a "0" TEB signal at its second input and hence does not pass an interrupt signal to processor 7A.

Assume now that processor 7B has highest priority (P–3 is a "1" and P-1 is a "0") and MPX–5 forms a "1" ANA interrupt signal but, by way of contrast processor 7B is in control state (TEB is a "1") hence cannot process the interrupt. The IR–3 signal is the same but the gate 38–33 is responsive to the coincidence of the "1" signals from 37–33 and the "1" TEB signal for forming a "1" TSO–3 signal. The gate 37–31 responds and applies a "1" signal to gate 39–31 which in coincidence receives the "1" ANA signal. The gate 39–31 responds to the coincidence of these signals for applying a "1" IR–1 interrupt signal to the interrupt handler 6A. As a result interrupt handler 6A of processor 7A processes the interrupt which could not be handled by processor 7B.

The operations of RTL–32 and RTL—34 are essentially the same as that of LTR–31 and LTR–33, and the operation thereof can be understood with reference to the foregoing description. The chief difference in operation is that by virtue of the transfer circuit coupling processor 7B is assigned a higher initial priority than processor 7A for the processing of external interrupts associated with MPX–5B.

It should be understood that the invention is not limited to a two processor system. For example, consider an embodiment of the present invention having three processors, each of which can process external interrupts associated with MPX–5A and MPX–5B. Each of the three processors (called processors 7X, 7Y and 7Z) has its own left to right transfer circuit, interrupt handler, processor unavailable line, and priority signal sources that produce logical levels determining the initial priorities of assignment. The left to right transfer circuit in each processor accepts as inputs a transfer signal from another left to right transfer circuit, a transfer enable signal from the processor unavailable line in that processor, an attention needed signal from MPX–5A, and a priority signal; and supplies as outputs a transfer signal to a different left to right transfer circuit and an interrupt request signal to the interrupt handler in that processor. The right to left transfer circuit in each processor accepts as inputs a transfer signal from a different right to left transfer circuit, a transfer enable signal from the processor unavailable line in that processor, an attention needed signal from MPX–5B, and a priority signal; and supplies as outputs a transfer signal to another right to left transfer circuit and an interrupt request signal to the interrupt handler in that processor.

For processing external interrupt conditions associated with MPX–5A, processor 7X is assigned the highest initial priority, processor 7Y is assigned the next highest initial priority, and processor 7Z is assigned the lowest initial priority. This priority scheme is established by having a logical "1" priority signal coupled to the left to right transfer circuit in processor 7X and by having a logical "0" priority signal coupled to each of the other left to right transfer circuits. By virtue of the logical "1" priority signal which is continuously applied to it, the left to right circuit in processor 7X is always partially enabled to supply and will immediately supply an interrupt request signal to the interrupt handler in processor 7X upon receipt of an attention needed signal from MPX–5A. In contrast, since a logical "0" is continuously applied to it, the left to right transfer circuit in processor 7Y is not partially enabled to supply and therefore will not immediately supply an interrupt request signal merely because an attention needed signal is received from MPX–5A. However, when processor 7X is unavailable, its left to right transfer circuit will supply a transfer signal which enables the left to right transfer circuit in processor 7Y to supply an interrupt request signal to the interrupt handler in processor 7Y. Similarly, since a logical "0" is continuously applied to it, the left to right transfer circuit in processor 7Z is not partially enabled to supply and therefore will not immediately supply an interrupt signal merely because an attention needed signal is received from MPX–5A. However, when both processor 7X and 7Y are unavailable, the left to right transfer circuit in processor 7Z will receive a transfer signal which enables it to supply an interrupt request signal to the interrupt handler in processor 7Z.

For processing external interrupts associated with MPX–5B, processor 7Z is assigned the highest initial priority, processor 7Y is assigned the next highest initial priority, and processor 7X is assigned the lowest priority. This priority scheme is established by having a logical "1" priority signal coupled to the right to left transfer circuit in processor 7Z and by having a logical "0" priority signal coupled to each of the other right to left transfer circuits.

What is claimed is:

1. A multi-processor data processing system comprising:

1. memory means for storing program and data words;
2. two interruptable processors for executing sequences of arithmetic and logical operations on digital data, each processor including
   a. means for executing program instructions for manipulating data in response to control signals,
   b. means responsive to program words obtained from the memory means for generating control signals which cause the data manipulating means to execute a sequence of program instructions,
   c. an interrupt handler operable in response to an interrupt command signal for forming control signals which cause the data manipulation means to interrupt the execution of a sequence of program instructions, the interrupt handler while it is operative cooperating with the data manipulation means to execute a supervisory task,
   d. bistable means having a first state for indicating that its interrupt handler is operative and hence unavailable and having a second state indicating that its interrupt handler is available;
   e. gating means enabled by the second state and disabled by the first state for supplying the interrupt command signal to the interrupt handler when an interrupt request signal is received only while the interrupt handler is available;
3. an input/output unit for transferring digital words into and out of the processing system;
4. signal generating means for indicating that the input/output unit has assumed a predetermined operating status which requires the attention of a processor to execute a supervisory task; and
5. means for simultaneously assigning to each processor a different initial priority for executing the supervisory tasks required by the input/output unit, a first one of the two processors being assigned initial primary priority and a second one being assigned initial secondary priority;
6. means responsive to the assigning means and the first state of the bistable means in the first processor for producing a transfer signal when the interrupt handler therein is unavailable; and
7. means responsive to the signal generating means, the assigning means, and the transfer signal for providing the interrupt request signal to only the gating means in the first processor when its interrupt handler is available and otherwise to both gating means and thereby causing the processors to share the load of executing the supervisory tasks required by the input/output unit.

2. In a programmable data processing system having first and second interrupt handling apparatus each having interruptable and non-interruptable states and each responsive to an interrupt control signal for handling an interrupt, and means for providing a signal requesting an interrupt, the combination comprising: means for simultaneously assigning a primary and a secondary priority in which each of said first and second interrupt handling apparatus is to handle an interrupt; and means responsive to a signal requesting an interrupt for applying an interrupt control signal to one of said first and second interrupt handling apparatus and thereby causing an interrupt, which includes means responsive to the assigning means for applying an interrupt control signal to the interrupt handling apparatus assigned primary priority while it is in its interruptable state and for applying an interrupt control signal to the interrupt handling apparatus assigned secondary priority while the other interrupt handling apparatus is in its interruptable state.

3. In an interruptable programmable data processing system including at least first and second means each making requests for an interrupt condition to be processed, an interrupt handling system comprising: first and second interrupt handlers, means for simultaneously assigning the first and second interrupt handlers primarily to said first and second means respectively, each handler having an interruptable state in which it can be actuated to process an interrupt; means responsive to the assigning means for selecting for actuation the respective primarily assigned interrupt handler when a request for access is made by either of said first or second means and for actuating such selected interrupt handler in response to its being in its interruptable state; and transfer means for selecting for actuation the other respective interrupt handler, not primarily assigned, when a request for access is made by either one of said first or second means and the interrupt handler primarily assigned thereto is in its non-interruptable state.

4. A system according to claim 3 wherein said transfer means comprises first and second gating means, the first gating means selectively coupling a request for access by said first means to said second interrupt handler and said second gating means coupling a request for access by said second means to said first interrupt handler.

5. In a data processing system having a pair of interruptable processors and an input/output unit, an automatic interrupt handling system comprising:

a pair of interrupt handlers for exercising control over data transfer operations of the input/output unit while a respective one of the interruptable processors is interrupted, each interrupt handler either being available for exercising such control or being unavailable therefor;

means for producing a first signal when the input/output unit assumes a predetermined operating status, the first signal representing a request for the attention of an interrupt handler to exercise such control;

means for simultaneously assigning initial primary priority to a first one of the interrupt handlers and initial secondary priority to the other interrupt handler for exercising such control;

means for producing a second signal during periods of time in which said first interrupt handler is unavailable;

means responsive to the assigning means and the first signal for actuating said first interrupt handler so as to exercise such control when that interrupt handler is available; and means responsive to the coincidence of the first and second signals for providing a third signal to said other interrupt handler to enable that interrupt handler to exercise its control when the first interrupt handler is unavailable.

6. The interrupt handling system of claim 5 wherein the priority assigning means comprises a source producing a continuous logical signal and wherein the means for activating the first interrupt handler comprises a gating circuit responsive to the coincidence of the continuous logical signal and the first signal to produce a signal for activating the first interrupt handler.

7. The interrupt handling system of claim 5 including a memory, the processors being programmatically controlled by object programs and an executive program obtained from the memory, an interrupt handler being provided in each processor and comprising a controllable operator control network responsive to the executive program; and means for simultaneously coupling the first signal to each of the processors so that whichever one of the interrupt handlers is assigned initial primary priority can respond thereto immediately.

8. A program controlled data processing system comprising:

first and second groups of input/output units for transferring data into and out of the data processing system;

first and second signal generating means, each for producing an attention needed signal for a corresponding one of the first and second groups, the attention needed signals indicating that a processor should be interrupted to process a supervisory task relating to the transfer of data;

first and second processors associated primarily with the first and second signal generating means respectively;

coupling means including means for coupling each processor to each signal generating means for transmitting each attention needed signal so as to be simultaneously received in each processor, and means for coupling the processors together for transmitting transfer signals therebetween;

each processor including first means for simultaneously assigning initial primary priority to attention needed signals transmitted thereto from its associated signal generating means and initial secondary priority to attention need signals transmitted thereto from the other signal generating means; second means for indicating whether the processor is available for executing a supervisory task; third means responsive to the second means for applying a transfer signal to the coupling means for transmission to the other processor; and fourth means responsive to the first, second, and third means for executing a supervisory task when available therefor and either an attention needed signal assigned initial primary priority is received or an attention needed signal assigned initial secondary priority and a transfer signal are received simultaneously.

9. A data processing system comprising:

first and second sources supplying attention needed signals, each attention needed signal indicating the existence of an external interrupt task which must be handled;

a plurality of processors; each processor including means for handling the processing of interrupt tasks, means for generating a control signal indicating whether its interrupt handling means is currently available or unavailable for processing an interrupt task, means responsive to the control signal for selectively enabling its interrupt handling means to respond to or not enabling it to respond to request signals to process an interrupt task, and means for generating a transfer signal when its interrupt handling means is unavailable;

means for coupling the processors together to form a first loop and a second loop for carrying transfer signals for dynamically distributing the task of handling an interrupt task in a first direction and a second direction respectively;

means for assigning to a first one of the processors highest priority with respect to the first source, and for assigning a second, different one of the processors highest priority with respect to the second source;

said first and second assigned processors further including means for providing an interrupt request signal to their respective interrupt handling means in response to each attention needed signal supplied by the first and second sources respectively, and each processor further including first and second gating means enabled by the coincidence of a transfer signal coupled thereto by the first loop and the second loop respectively and an attention needed signal supplied by a source with respect to which it has not been assigned highest priority for providing interrupt request signals to their corresponding interrupt handling means.

10. A programmable data processing system comprising:

a. a plurality of input and/or output units providing attention needed signals;

b. a plurality of digital data processors;

c. for each processor 1. an interrupt handler for the corresponding processor,
2. an interrupt transfer circuit, and
3. a busy indicator for the corresponding interrupt handler;

d. means for coupling the interrupt transfer circuits together and to the interrupt handler for the corresponding processor; and e. means for assigning to each processor a priority for attention to the input and/or output units;

said transfer circuits comprising means responsive to said priority means, a not busy indication, and a predetermined attention needed signal for activating the interrupt handler for the corresponding processor and responsive to a busy indication for enabling another transfer circuit to respond to the same predetermined attention needed signal and thereby activate the interrupt handler for the processor associated with said another transfer circuit.

11. A system according to claim 10 wherein the transfer circuits comprise at least first and second transfer circuits; means for coupling the first transfer circuits together for transfer of interrupt requests in one direction between processors; and means for coupling the second transfer circuits together for transfer in a second direction between processors.

* * * * *